(12) United States Patent
Parrish et al.

(10) Patent No.: US 11,614,158 B2
(45) Date of Patent: Mar. 28, 2023

(54) HYDRAULIC GEROTOR PUMP FOR AUTOMATIC TRANSMISSION

(71) Applicant: GM GLOBAL TECHNOLOGY OPERATIONS LLC, Detroit, MI (US)

(72) Inventors: Robert Parrish, White Lake, MI (US); Wenying Yang, Rochester Hills, MI (US); Zhe Li, Rochester, MI (US); Abir R. Das, Karnataka (IN); Chad M. Huls, Royal Oak, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 268 days.

(21) Appl. No.: 16/927,172

(22) Filed: Jul. 13, 2020

(65) Prior Publication Data

US 2022/0010874 A1  Jan. 13, 2022

(51) Int. Cl.
*F16H 57/04* (2010.01)
*F04C 2/08* (2006.01)
(Continued)

(52) U.S. Cl.
CPC ......... *F16H 57/0436* (2013.01); *F04C 2/084* (2013.01); *F04C 2/102* (2013.01);
(Continued)

(58) Field of Classification Search
CPC ............. F16H 57/0436; F16H 57/0435; F16H 57/0441; F04C 2/084; F04C 2/102; F04C 14/18
See application file for complete search history.

(56) References Cited

U.S. PATENT DOCUMENTS 4,744,738 A * 5/1988 Miki ...................... F01C 1/086
  418/179
5,338,168 A * 8/1994 Kondoh .................. F04C 2/082
  418/179

(Continued)

FOREIGN PATENT DOCUMENTS

CN  113931836 A  1/2022
DE  102021106131 A1  1/2022
(Continued)

OTHER PUBLICATIONS

First Office Action for German Patent Application No. 10 2021 106 131.8 dated Dec. 21, 2021; 7 pages.

(Continued)

*Primary Examiner* — Deming Wan
(74) *Attorney, Agent, or Firm* — Harness, Dickey & Pierce, P.L.C.

(57) ABSTRACT

A hydraulic gerotor pump for an automatic transmission may comprise a housing and a gear set rotatably disposed within the housing. The gear set may comprise an inner gear and an outer gear having radially opposed intermeshing teeth that together define a plurality of circumferentially disposed variable volume pumping chambers therebetween. The housing may be made of a first aluminum-based material, and the inner gear and the outer gear of the gear set may be made of a second aluminum-based material. The linear coefficient of thermal expansion of the first aluminum-based material may be substantially the same as that of the second aluminum-based material.

20 Claims, 2 Drawing Sheets

(51) Int. Cl.
*F04C 2/10* (2006.01)
*F04C 14/18* (2006.01)

(52) U.S. Cl.
CPC ......... *F04C 14/18* (2013.01); *F16H 57/0435* (2013.01); *F16H 57/0441* (2013.01); *F04C 2240/30* (2013.01); *F05C 2201/021* (2013.01)

(56) References Cited

U.S. PATENT DOCUMENTS

| | | | | |
|---|---|---|---|---|
| 6,089,843 | A * | 7/2000 | Kondoh | F16C 33/121 419/30 |
| 6,287,361 | B1 | 9/2001 | Hauptmann et al. | |
| 6,695,604 | B1 * | 2/2004 | Yu | F04C 2/102 418/77 |
| 9,482,224 | B2 | 11/2016 | Naiki | |
| 2009/0087563 | A1 * | 4/2009 | Voegele | F04C 2/084 74/462 |
| 2010/0071495 | A1 * | 3/2010 | Satou | F16C 33/6637 74/457 |
| 2011/0229361 | A1 * | 9/2011 | Kuroda | F04C 2/102 418/166 |
| 2014/0079578 | A1 * | 3/2014 | Irie | F04C 2/102 417/423.14 |
| 2014/0154120 | A1 * | 6/2014 | Izutsu | F04C 2/10 418/19 |
| 2015/0132163 | A1 * | 5/2015 | Wright | F04C 2/102 417/420 |
| 2015/0357886 | A1 * | 12/2015 | Ishizeki | F04C 11/008 310/71 |

FOREIGN PATENT DOCUMENTS

| | | |
|---|---|---|
| JP | 2013170503 A | 9/2013 |
| JP | 2016065493 A | 4/2016 |

OTHER PUBLICATIONS

First Office Action for Chinese Patent Application No. 202110376833.8 dated Jan. 11, 2023, with correspondence from China Patent Agent (H.K.) Ltd summarizing Office Action; 14 pages.

* cited by examiner

HYDRAULIC GEROTOR PUMP FOR AUTOMATIC TRANSMISSION

INTRODUCTION

The present disclosure relates to hydraulic gerotor pumps, which may be used in a variety of applications, including automotive applications, for example, as hydraulic pumps for automatic transmissions of automotive vehicles. Gerotor pumps are classified as positive displacement rotary pumps that displace a fixed quantity of liquid with each revolution of their pumping elements (gears or rotors) by creating a space between the pumping elements and trapping liquid in the space. Rotation of the pumping elements then reduces the size of this space and moves the liquid out of the pump. Gerotor pumps are further classified as internal gear pumps and include a set of inner and outer gears with intermeshing teeth. The inner gear is coupled to and driven by a drive shaft, which drives rotation of the gear set within a cylindrical cavity defined by a pump housing. As the gear set rotates, the teeth of the inner gear mesh and unmesh with the teeth of the outer gear to form a series of variable volume pumping chambers therebetween through which the liquid is transferred between a suction port and a discharge port.

To ensure efficient operation of the gerotor pump, the gear set is sized and positioned within the cylindrical cavity of the pump housing to achieve an optimal axial and radial clearance between the external surfaces of the gear set and the opposing surfaces of the pump housing. If the clearance is too large, a portion of the liquid may slip around and past the gear set from the relatively high pressure discharge port toward the relatively low pressure suction port during operation of the pump, thereby reducing the volumetric efficiency of the pump (i.e., the total volume of liquid actually discharged from the pump as a percentage of the total volume of liquid theoretically displaced or pumped by the pump). At the same time, if the axial clearance is too small, the friction forces experienced by the gear set may substantially increase the amount of torque required to drive rotation of the gear set, especially at low temperatures. In situations where the pump housing is made of a material having a different coefficient of thermal expansion than that of the gear set, for example, where the housing is made of an aluminum-based material and the gear set is made of steel, any change in temperature will cause the aluminum-based housing to expand or contract in size in an amount disproportionate to that of the steel gear set. As a result, the axial clearance between the aluminum-based housing and the steel gear set may not be constant and may vary based upon the temperature of the operating environment. For example, because the linear coefficient of thermal expansion (the change in length of a material per degree temperature change) of aluminum is greater than that of steel, the axial clearance between the aluminum-based housing and the steel gear set may be relatively small at low temperatures and relatively large at higher operating temperatures. In such instances, the gear set must be sized to ensure a minimum axial and radial clearance exists between the external surfaces of the gear set and the opposing surfaces of the pump housing at all possible operating temperatures to avoid circumstances where the frictional forces acting on the gear set are sufficient to effectively prevent rotation thereof and operation of the pump.

Gerotor pumps used in hydraulic systems of automotive vehicles may employ a pump housing made of an aluminum-based material and an internal gear set made of steel so that the pump exhibits a desirable combination of light weight and robustness. In such case, to ensure effective operation of the gerotor pump at all possible operating temperatures of the vehicle, e.g., at temperatures between −40° C. and 160° C., the gear set is typically sized to ensure a minimum axial clearance exists between the steel gear set and the aluminum-based pump housing at the lowest possible operating temperature, e.g., at −40° C. However, sizing the gear set in this way may result in an axial clearance between the gear set and the pump housing that is undesirably large at normal vehicle operating temperatures, e.g., at temperatures between 20° C. and 60° C. As such, the volumetric efficiency of the gerotor pump may be substantially impaired for most of the time the vehicle is in operation.

SUMMARY

A hydraulic gerotor pump for an automatic transmission may comprise a housing and a gear set rotatably disposed within a cavity defined by the housing. The housing may have an inlet and an outlet in fluid communication with the cavity. The gear set may comprise an inner gear and an outer gear. The inner gear and the outer gear may have radially opposed intermeshing teeth that together define a plurality of circumferentially disposed variable volume pumping chambers therebetween. The housing may be made of a first aluminum-based material. The inner gear and the outer gear of the gear set may be made of a second aluminum-based material. A linear coefficient of thermal expansion of the first aluminum-based material may be substantially the same as that of the second aluminum-based material.

The gerotor pump may exhibit a volumetric efficiency greater than 80% at temperatures in a range of −40° C. to 160° C.

The housing of the gerotor pump may comprise an aluminum alloy comprising at least one alloying element selected from the group consisting of iron (Fe), silicon (Si), copper (Cu), magnesium (Mg), manganese (Mn), or zinc (Zn). In such case, the housing may be formed by casting.

The inner gear and the outer gear of the gear set may comprise an aluminum alloy comprising at least one alloying element selected from the group consisting of iron (Fe), silicon (Si), copper (Cu), magnesium (Mg), manganese (Mn), or zinc (Zn). In such case, the aluminum alloy may exhibit a linear coefficient of thermal expansion in a range of 21 μm/m-° C. to 24 μm/m-° C. at temperatures in a range of 20° C. to 100° C.

In some embodiments, the inner gear and the outer gear of the gear set may be formed by casting or forging.

In some embodiments, the inner gear and the outer gear of the gear set may comprise an aluminum-matrix composite. In such case, a matrix phase of the aluminum-matrix composite may comprise an aluminum alloy and a dispersed phase of the aluminum-matrix composite may comprise a ceramic.

In some embodiments, the inner gear and the outer gear of the gear set may be formed by powder metallurgy.

The cavity defined in the housing may be at least partially defined by a back wall, a circular side wall, and a face wall of the housing. At the same time, the gear set may have a front face that faces toward and opposes the face wall of the housing, a rear face that faces toward and opposes the back wall of the housing, and an outer circumferential surface that faces toward and opposes the circular side wall of the housing.

The gear set may be sized and positioned within the cavity of the housing such that an axial clearance is defined between the front face of the gear set and the face wall of the housing. In such case, the axial clearance may be substantially constant at temperatures in a range of −40° C. to 160° C. In some embodiments, the axial clearance between the front face of the gear set and the face wall of the housing may be in a range of 0.03 mm to 0.09 mm at temperatures in a range of −40° C. to 160° C.

The front face, the rear face, or the outer circumferential surface of the gear set may be coated with a metal, metal alloy, ceramic, cermet, or diamond-like carbon (DLC) material.

The inner gear of the gear set may have an outer circumferential surface and the outer gear of the gear set may have an inner circumferential surface, and the intermeshing teeth of the gear set may be defined by the outer circumferential surface of the inner gear and the inner circumferential surface of the outer gear. In such case, the outer circumferential surface of the inner gear or the inner circumferential surface of the outer gear may be coated with a metal alloy, ceramic, or cermet. In some embodiments, the outer circumferential surface of the inner gear or the inner circumferential surface of the outer gear may be chemically treated by an anodizing, boriding, nitriding, or carburizing process.

A hydraulic system for an automatic transmission may comprise a hydraulic gerotor pump and an electric motor. The hydraulic gerotor pump may comprise a housing and a gear set. The housing may have an inlet and an outlet, and may define a cavity in fluid communication with the inlet and the outlet thereof. The gear set may be rotatably disposed within the cavity of the housing. The gear set may comprise an inner gear and an outer gear. The inner gear and the outer gear of the gear set may have radially opposed intermeshing teeth that together define a plurality of circumferentially disposed variable volume pumping chambers therebetween. The housing may be made of a first aluminum-based material and the inner gear and the outer gear of the gear set may be made of a second aluminum-based material. A linear coefficient of thermal expansion of the first aluminum-based material may be substantially the same as that of the second aluminum-based material. The electric motor may include a rotor coupled to a drive shaft and a stator surrounding the rotor. The rotor of the electric motor may include multiple circumferentially disposed permanent magnets. The drive shaft of the electric motor may be mechanically coupled to the inner gear of the gear set of the hydraulic gerotor pump and may be operable to drive rotation of the gear set.

The hydraulic system may further comprise a hydraulic fluid sump in fluid communication with the inlet of the housing.

The hydraulic system may further comprise a transmission control system in fluid communication with the outlet of the housing.

An automatic transmission may comprise a hydraulic gerotor pump, an electric motor, a hydraulic fluid sump, a transmission control system, and a gear and clutch arrangement. The hydraulic gerotor pump may comprise a housing and a gear set. The housing may have an inlet and an outlet, and may define a cavity in fluid communication with the inlet and the outlet thereof. The gear set may be rotatably disposed within the cavity of the housing. The housing may be made of a first aluminum-based material and the inner gear and the outer gear of the gear set may be made of a second aluminum-based material. A linear coefficient of thermal expansion of the first aluminum-based material may be substantially the same as that of the second aluminum-based material. The electric motor may include a rotor coupled to a drive shaft and a stator surrounding the rotor. The drive shaft of the electric motor may be mechanically coupled to the inner gear of the gear set of the hydraulic gerotor pump and may be operable to drive rotation of the gear set. The hydraulic fluid sump may be in fluid communication with the inlet of the housing. The transmission control system may be in fluid communication with the outlet of the housing. The gear and clutch arrangement may transmits torque between an input shaft and an output shaft. The gear and clutch arrangement may selectively receive pressurized hydraulic fluid from the transmission control system.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed hydraulic gerotor pump includes a housing made of an aluminum-based material and a gear set disposed within the housing that is likewise made of an aluminum-based material. Using an aluminum-based material for both the housing and the internal gear set beneficially results in a gear set that exhibits substantially the same linear coefficient of thermal expansion as that of the housing, unlike gerotor pumps that employ aluminum-based housings and steel gear sets. One or more tribological coatings may be formed on surfaces of the gear set to provide the gear set with improved resistance to wear and pitting, without altering the thermal behavior of the gear set relative to that of the housing.

Because the housing and the gear set of the gerotor pump exhibit substantially the same linear coefficients of thermal expansion, the axial clearance between the axial front and rear faces of the gear set and the front and back walls of the housing will remain substantially constant over the entire operating temperature of the gerotor pump (e.g., at temperatures in the range of −40° C. to 160° C.). As such, the gear set can be sized and positioned within the housing so that the axial clearance between the gear set and the housing is optimized over the entire operating temperature of the gerotor pump. This means that the volumetric efficiency of the gerotor pump can be maximized over the entire operating temperature of the gerotor, without prohibitively increasing the amount of torque required to overcome the frictional forces experienced by the gear set under cold-start conditions. In addition, because the axial clearance between the gear set and the housing will remain constant over the entire operating temperature of the gerotor pump, and thus will not reach a minimum at the lowest operating temperatures of the gerotor pump (e.g., −40° C.), the amount of torque required to initiate rotation of the gear set at such low temperatures may be reduced, as compared to the amount of torque that would otherwise be required to initiate rotation of a steel gear set disposed within the same aluminum-based housing. In turn, this will allow for a reduction in the power rating of the electric motor responsible for driving rotation of the gear set and operation of the gerotor pump.

The term "aluminum-based material," as used herein, refers to materials that comprise pure aluminum (Al), an alloy of aluminum and at least one other metal or nonmetal (alloying element), e.g., iron (Fe), silicon (Si), copper (Cu), magnesium (Mg), manganese (Mn), and/or zinc (Zn), or a composite having an aluminum alloy matrix phase and a ceramic dispersed phase. As used herein, the term "ceramic" refers to an inorganic compound of a metal or metalloid and a non-metal. Aluminum alloys and aluminum-matrix composites may comprise, by weight, 85% or more aluminum, preferably ≥90% aluminum, and more preferably ≥95% aluminum. Other metal or nonmetal elements unintentionally may be present, for example, as impurities, in aluminum-based materials in relatively small amounts, e.g., less than 5%, preferably less than 3%, and more preferably less than 1% by weight of the aluminum-based material.

Figure 1:
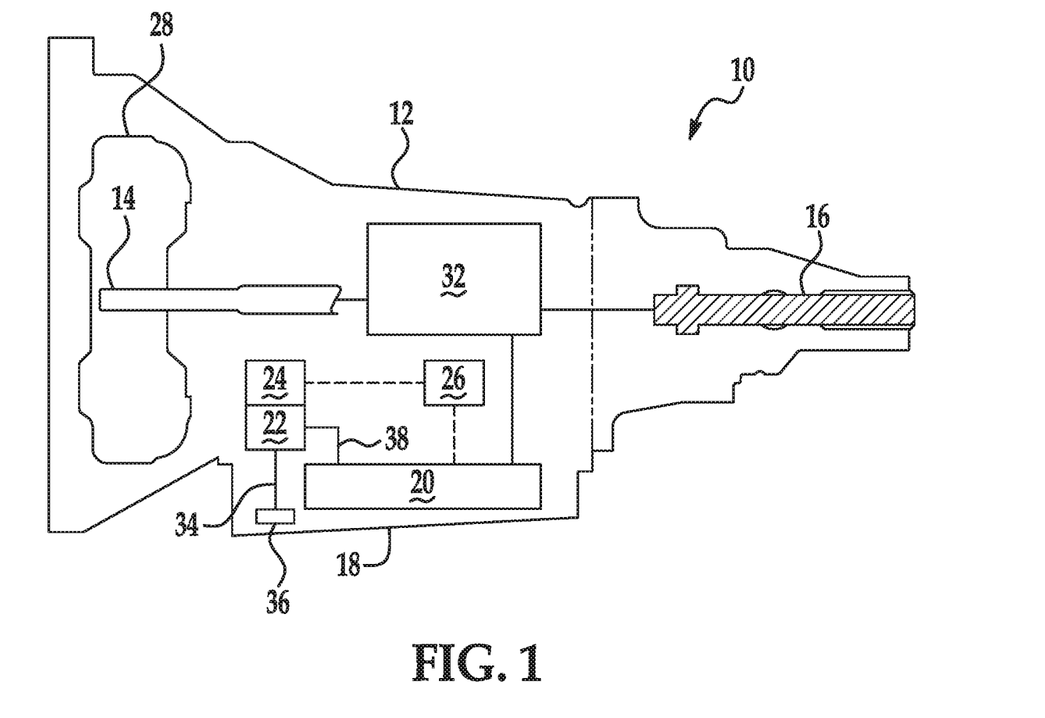
FIG. 1 is a schematic depiction of an automatic transmission for an automotive vehicle including a hydraulic fluid sump, a hydraulic control system, a hydraulic gerotor pump driven by an electric motor, and a transmission control module.

FIG. 1 depicts an automatic transmission 10 for an automotive vehicle that includes a metal housing 12, an input shaft 14, an output shaft 16, a hydraulic fluid sump 18, a transmission control system 20, a hydraulic gerotor pump 22, an electric motor 24 connected to the hydraulic gerotor pump 22, and a transmission control module 26.

The housing 12 receives, surrounds, mounts and protects the various components of the transmission 10. The input shaft 14 is driven by a prime mover (not shown), which may be a gasoline, diesel, flex fuel, or hybrid power plant. The input shaft 14 is coupled to a torque converter 28 and is coupled to the output shaft 16 via a gear and clutch arrangement 32, which includes a system of torque transmitting devices (clutches and/or brakes), gear sets, and shafts. The gear and clutch arrangement 32 provides speed and torque conversions and a desired gear ratio between the input shaft 14 and the output shaft 16. The output shaft 16 provides drive torque to a final drive unit or transfer case (not shown), for example, via propeller shafts, differentials, and/or drive axles (not shown). The sump 18 is positioned at the bottom of the housing 12 and collects and stores hydraulic fluid from the various hydraulic components of the automatic transmission 10.

The transmission control system 20 receives pressurized hydraulic fluid from the hydraulic gerotor pump 22 and is configured to supply hydraulic fluid to the components of the gear and clutch arrangement 32 to lubricate and control operation of such components. The transmission control system 20 may include a valve body having a plurality of fluid passages, valves, and/or solenoids that selectively transfer pressurized hydraulic fluid to the various components of the gear and clutch arrangement 32 and the transmission 10.

The transmission control module 26 controls operation of the transmission control system 20 and the electric motor 24, and is preferably an electronic control device having a preprogrammed digital computer or processor, control logic, memory used to store data, and at least one I/O peripheral. The control logic includes a plurality of logic routines for monitoring, manipulating, and generating data. It will be appreciated that the transmission control module 26 may be a stand-alone controller that controls operation of the transmission 10, or the functionality of the transmission control module 26 may be integrated with other vehicle controllers.

The hydraulic gerotor pump 22 is a positive displacement rotary pump and is operable to circulate and pressurize the hydraulic fluid in the transmission control system 20 of the transmission 10. The hydraulic gerotor pump 22 draws hydraulic fluid from the sump 18 via a suction or inlet line 34 that may be coupled to a filter 36 submerged in the sump 18 that separates out particulate matter from the hydraulic fluid in the sump 18 before the hydraulic fluid enters the gerotor pump 22. Hydraulic fluid is discharged from the gerotor pump 22 via a supply or outlet line 38 and is transferred to the transmission control system 20.

Figure 2:
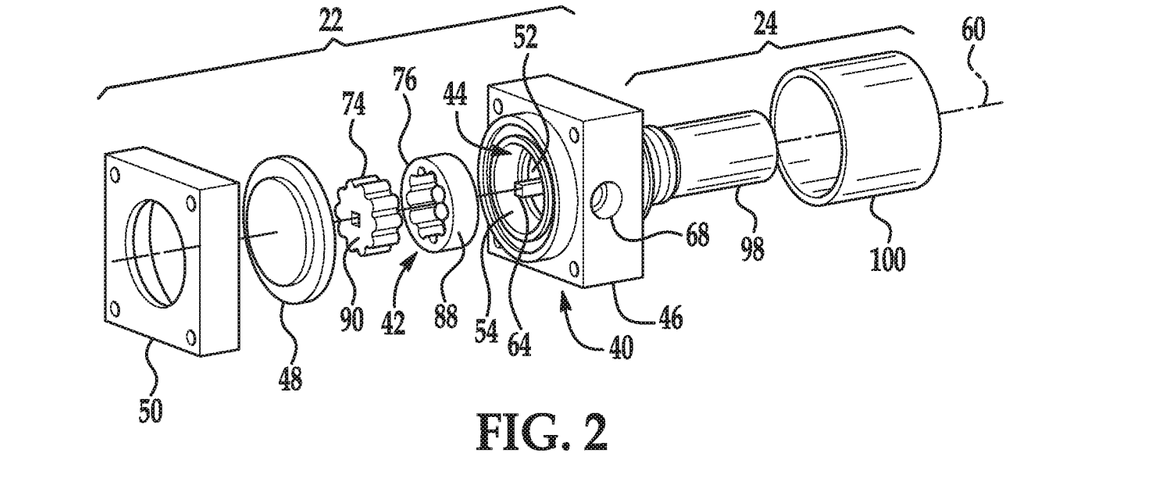
FIG. 2 is a schematic exploded perspective view of the hydraulic pump and the electric motor of FIG. 1.
Figure 3:
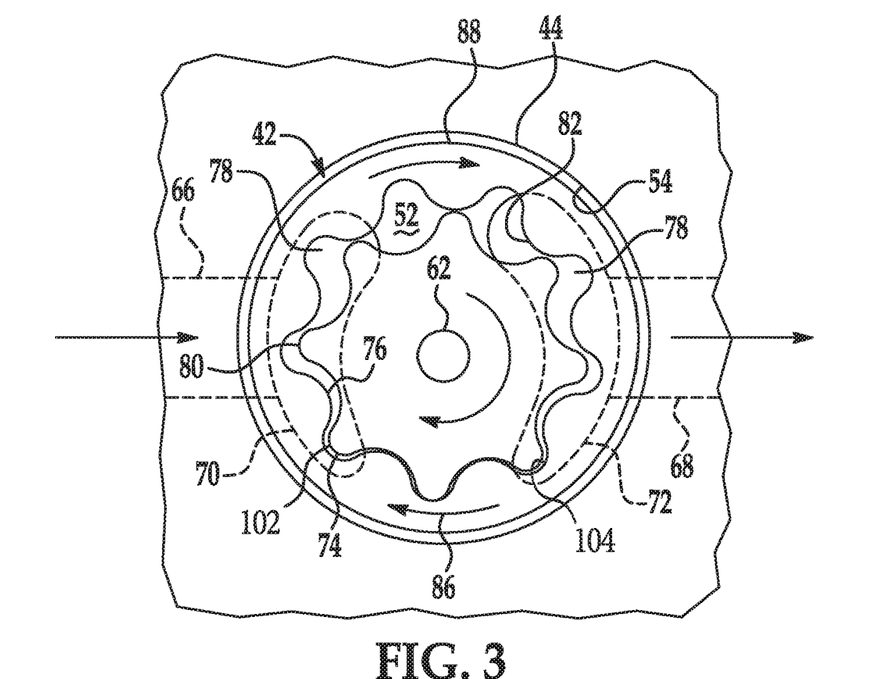
FIG. 3 is a schematic partial cross-sectional view of the hydraulic pump of FIG. 2.
Figure 4:
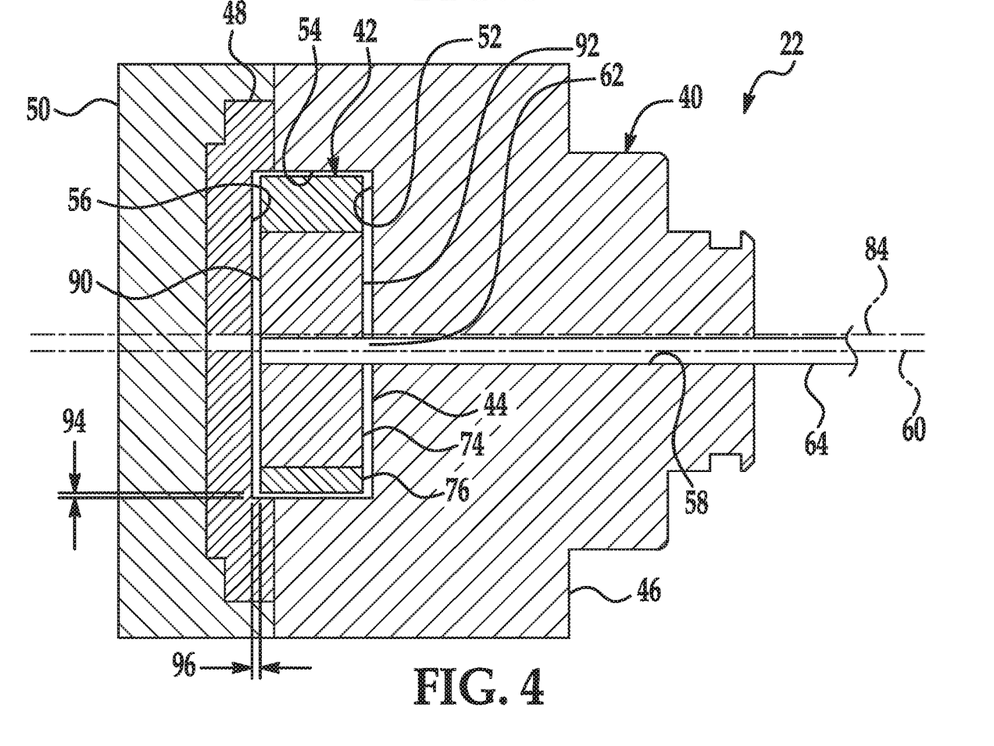
FIG. 4 is a schematic side cross-sectional view of the hydraulic pump of FIG. 2.

Referring now to FIGS. 2, 3, and 4, the hydraulic gerotor pump 22 includes a housing 40 and an internal rotor or gear set 42 rotatably disposed within a cylindrical cavity 44 defined by the housing 40. The housing 40 encloses the gear set 42 within the cylindrical cavity 44 and may comprise a body 46, a cover 48, and an end plate 50 secured to the body 46, for example, by bolts (not shown). The body 46 may include a back wall 52 and a circular side wall 54, and the cover 48 may include a face wall 56 that, in assembly, faces toward the back wall 52 of the body 46. The cylindrical cavity 44 may be at least partially defined by the back wall 52, the side wall 54, and the face wall 56 of the housing 40. An axial bore 58 is defined in the back wall 52 of the housing 40 that extends along a first axis 60 to an opening 62 in the cylindrical cavity 44 of the housing 40. In assembly, a drive shaft 64 of the electric motor 24 extends through the axial bore 58 in the back wall 52 of the housing 40 and operates to drive rotation of the internal gear set 42 during operation of the gerotor pump 22.

The housing 40 includes an inlet 66 and an outlet 68 in fluid communication with the inlet 66. The inlet 66 is in fluid communication with the inlet line 34 and the outlet 68 is in fluid communication with the outlet line 38. In addition, the inlet 66 is in fluid communication with the cylindrical cavity 44 via a suction port 70 defined in the back wall 52 of the housing 40 and the outlet 68 is in fluid communication with the cylindrical cavity 44 via a discharge or pressure port 72 defined in the back wall 52 of the housing 40. In operation, hydraulic fluid is received in the inlet 66 of the housing 40 via the inlet line 34, received in the cylindrical cavity 44 via the suction port 70, discharged from the cylindrical cavity 44 via the pressure port 72 and received in the outlet 68 of the housing 40, and subsequently discharged from the outlet 68 of the housing 40 via the outlet line 38.

The housing 40 is made of an aluminum-based material, and thus may comprise pure aluminum (Al), an aluminum alloy, or an aluminum-matrix composite. The aluminum-based housing 40 may be formed by casting (e.g., die casting, sand casting, or permanent mold casting), wrought by hot or cold working (e.g., forging), or by powder metallurgy. The aluminum-based material of the housing 40 may be tempered, for example, by strain hardening and/or thermal treatments. Aluminum alloys that may be used for the housing 40 of the gerotor pump 22 include aluminum-silicon alloys, aluminum-silicon-magnesium alloys, aluminum-silicon-copper alloys, aluminum-silicon-copper-iron alloys, aluminum-tin-copper-nickel-magnesium alloys, and aluminum-copper-silver alloys. One specific aluminum-silicon-copper-iron alloy that may be used for the housing 40 is aluminum alloy A380.0, which may comprise, by weight, 7.5-9.5% Si, 3-4% Cu, 1.3% Fe, and Al as balance. Aluminum alloys that comprise 4-13% silicon by weight of the aluminum alloy, and optionally one or more other alloying elements (i.e., metals or nonmetals), may beneficially be used in embodiments where the housing 40 is formed by casting.

The aluminum-based material of the housing 40 may exhibit a linear coefficient of thermal expansion in the range of 21 μm/m-° C. to 24 μm/m-° C. at temperatures in the range of 20° C. to 100° C. By contrast, the linear coefficient of thermal expansion of steel is generally in the range of 9 μm/m-° C. to 13 μm/m-° C. at temperatures in the range of 20° C. to 100° C.

The gear set 42 is disposed within the cylindrical cavity 44 of the housing 40 such that the gear set 42 overlies the suction and pressure ports 70, 72 and is supported for rotation in the cylindrical cavity 44 by the drive shaft 64 of the electric motor 24. More specifically, the gear set 42 includes an inner rotor or gear 74 disposed upon and secured to the drive shaft 64 of the electric motor 24 and an outer rotor or gear 76 that surrounds the inner gear 74 within the cylindrical cavity 44 of the housing 40.

As best shown in FIG. 3, the inner and outer gears 74, 76 include radially opposed intermeshing lobes or teeth that together define a plurality of circumferentially disposed variable volume pumping chambers 78 therebetween. The inner gear 74 includes teeth 80 disposed along an outer circumferential surface 102 thereof and the outer gear 76 includes teeth 82 disposed along an inner circumferential surface 104 thereof. The inner gear 74 includes N teeth 80 disposed along its outer circumferential surface 102, where N≥4, and the outer gear 76 includes N+1 teeth 82 disposed along its inner circumferential surface 104. In FIG. 3, the inner gear 74 includes eight (8) teeth 80 disposed along its outer circumferential surface 102 and the outer gear 76 includes nine (9) teeth 82 disposed along its inner circumferential surface 104. The number of teeth 80, 82 and the geometric profiles of the teeth 80, 82 of the inner and outer gears 74, 76 may be selected based upon certain desired performance characteristics of the gerotor pump 22, such as desired discharge volume. For example, the geometric profile of the teeth 80, 82 of the inner and outer gears 74, 76 may be cycloidal, circular, elliptical, hypotrochoidal, sinusoidal, or asymmetric, to name a few.

In operation, rotation of the inner gear 74 is driven by rotation of the drive shaft 64 which, in turn, drives rotation of the outer gear 76. The drive shaft 64 and the inner gear 74 rotate together around the first axis 60, while the outer gear 76 rotates around a second axis 84 offset from the first axis 60. In the embodiment depicted in FIG. 3, the drive shaft 64 and the inner and outer gears 74, 76 rotate in a clockwise pumping direction 86 around their respective eccentric first and second axes 60, 84. During rotation of the gear set 42, the teeth 80, 82 of the inner and outer gears 74, 76 mesh and unmesh and the volume of each of the pumping chambers 78 either increases or decreases. As the volume of one of the pumping chambers 78 begins to increase, that pumping chamber 78 enters into fluid communication with the suction port 70 of the gerotor pump 22 and low pressure hydraulic fluid is drawn into the pumping chamber 78 through the inlet 66 of the gerotor pump 22. As the gear set 42 continues to rotate, the volume of the pumping chamber 78 reaches its maximum and is no longer in fluid communication with the suction port 70. As the gear set 42 rotates further, the volume of the pumping chamber 78 starts to decrease and the pumping chamber 78 enters into fluid communication with the pressure port 72 of the gerotor pump 22. As the volume of the pumping chamber 78 decreases further, the hydraulic fluid therein is expelled from the cavity 44 via the pressure port 72 and into the outlet 68 of the gerotor pump 22.

The inner and outer gears 74, 76 of the gear set 42 are made of an aluminum-based material. The inner and outer gears 74, 76 may comprise the same aluminum-based material as that of the housing 40, or the gears 74, 76 may comprise a different aluminum-based material than that of the housing 40. Like the housing 40, the inner and outer gears 74, 76 may be formed by casting (e.g., die casting, sand casting, or permanent mold casting), wrought by hot or cold working (e.g., forging), or by powder metallurgy (consolidation, pressing, and sintering of aluminum-based material powders), and may be tempered, for example, by strain hardening and/or thermal treatments (e.g., annealing, solution heat-treating, and/or artificial ageing).

The aluminum-based material of the inner and outer gears 74, 76 may exhibit a linear coefficient of thermal expansion in the range of 21 μm/m-° C. to 24 μm/m-° C. at temperatures in the range of 20° C. to 100° C. The linear coefficient of thermal expansion of the aluminum-based material of the inner and outer gears 74, 76 may be substantially the same as that of the aluminum-based material of the housing 40. In the present disclosure, two aluminum-based materials are said to have substantially the same linear coefficient of thermal expansion where the difference between their linear coefficients of thermal expansion is equal to or less than 3 μm/m-° C. at temperatures in the range of 20° C. to 100° C.

Aluminum alloys that may be used for the inner and outer gears 74, 76 of the gear set 42 include aluminum-silicon alloys, aluminum-silicon-magnesium alloys, aluminum-chromium-copper-magnesium-silicon alloys, aluminum-copper-magnesium-manganese alloys, aluminum-silicon-copper alloys, aluminum-silicon-copper-iron alloys, aluminum-tin-copper-nickel-magnesium alloys, and aluminum-copper-silver alloys. In one form, the inner and outer gears 74, 76 may comprise aluminum alloy A380.0, which may comprise, by weight, 7.5-9.5% Si, 3-4% Cu, 1.3% Fe, and Al as balance. In another form, the inner and outer gears 74, 76 may comprise aluminum alloy A356.0-T6, which may comprise, by weight, 6.5-7.5% Si, 0.25-0.45% Mg, and Al as balance. Aluminum alloys that comprise 4-13% Si by weight of the aluminum alloy, and optionally one or more other alloying elements (i.e., metals or nonmetals), may beneficially be used in embodiments where the inner and outer gears 74, 76 are formed by casting. In one form, the inner and outer gears 74, 76 may comprise aluminum alloy AA 6061-T6, which may comprise, by weight, 0.4-0.8% Si, 0.8-1.2% Mg, 0.15-0.4% Cu, <0.7% Fe, 0.04-0.35% Cr, and Al as balance. In yet another form, the inner and outer gears 74, 76 may comprise aluminum alloy AA 2048-T6, which may comprise, by weight, 2.8-3.8% Cu, 1.2-1.8% Mg, 02-0.6% Mn, <0.2% Fe, and Al as balance. Aluminum alloys that comprise 2-6% Cu, 0.2-1.6% Mn, 0.3-13% Si, 0.5-5.1% Mg, and/or 1-11% Zn by weight of the aluminum alloy, and optionally one or more other alloying elements (i.e., metals or nonmetals), may beneficially be used in embodiments where the inner and outer gears 74, 76 are formed by forging or powder metallurgy.

In embodiments where the aluminum-based material of the inner and outer gears 74, 76 is an aluminum-matrix composite, the matrix phase of the composite may comprise an aluminum alloy, as described above, and the dispersed phase may comprise AlN, SiC, $Al_2O_3$, C, $SiO_2$, B, BN, $B_4C$, $Si_3N_4$, TiC, $TiO_2$, $TiB_2$, graphite, and combinations thereof. The dispersed phase may comprise, by weight, less than 10%, preferably less than 5%, and more preferably less than 1% of the aluminum-matrix composite. In one specific embodiment, the aluminum-based material of the inner and outer gears 74, 76 may comprise an aluminum-matrix composite having an aluminum-copper-magnesium-manganese alloy matrix phase and a dispersed phase of AlN, and the dispersed phase may comprise, by weight, less than 1%, preferably less than 0.55%, and more preferably about 0.2% of the aluminum-matrix composite.

As best shown in FIG. 4, the outer gear 76 defines an outer circumferential surface 88 of the gear set 42 and the inner and outer gears 74, 76 together define an axial front face 90 and an opposite axial rear face 92 of the gear set 42. The gear set 42 is sized and positioned within the cylindrical cavity 44 of the housing 40 such that a radial gap or clearance 94 exists between the outer circumferential surface 88 of the gear set 42 and the circular side wall 54 of the housing 40. At the same time, the gear set 42 is sized and positioned within the cylindrical cavity 44 of the housing 40 such that an axial gap or clearance 96 exists between the axial front face 90 of the gear set 42 and the face wall 56 of the housing 40 and between the opposite axial rear face 92 of the gear set 42 and the back wall 52 of the housing 40.

The gear set 42 is sized and positioned within the cylindrical cavity 44 of the housing 40 such that the axial clearance 96 between the faces 90, 92 of the gear set 42 and the opposing walls 56, 52 of the housing 40 is optimized to provide the gerotor pump 22 with high volumetric efficiency. For example, the gear set 42 may be sized and positioned within the cylindrical cavity 44 of the housing 40 so that the axial clearance 96 between the faces 90, 92 of the gear set 42 and the opposing walls 56, 52 of the housing 40 is in a range of 0.03 mm to 0.09 mm. Because the housing 40 and the inner and outer gears 74, 76 of the gear set 42 are made of aluminum-based materials that exhibit substantially the same linear coefficients of thermal expansion, the axial clearance 96 therebetween will remain substantially constant over a wide range of operating temperatures, e.g., at temperatures in a range of −40° C. to 160° C. In the present disclosure, the axial clearance 96 may be said to be substantially constant if the change in axial clearance 96 over the entire operating temperature range of −40° C. to 160° C. is less than 0.01 mm, preferably less than 0.005 mm, and more preferably less than 0.001 mm. The volumetric efficiency of the gerotor pump 22 at temperatures in a range of −40° C. to 160° C. may be greater than 70%, preferably greater than 80%, and more preferably greater than 90%.

One or more surfaces of the inner and outer gears 74, 76 of the gear set 42 optionally may be coated or otherwise treated to improve the tribological characteristics thereof. For example, one or more tribological coatings may be applied to one or more surfaces of the gear set 42 to improve the wear resistance, lubricity, and friction behavior thereof. Additionally or alternatively, one or more surfaces of the gear set 42 may be subjected to a chemical and/or thermal treatment process to improve the wear resistance, lubricity, and/or friction behavior thereof. Examples of chemical treatments that may be performed on one or more surfaces of the gear set 42 include anodizing, boriding, nitriding, and/or carburizing. In some embodiments, the one or more tribological coatings applied to the gear set 42 may comprise nickel (Ni), iron (Fe), zinc (Zn), and/or chromium (Cr) and may be applied to the one or more surfaces of the gear set 42 using an electroplating or an electroless plating technique. In other embodiments, the one or more tribological coatings applied to the gear set 42 may comprise a metal alloy (e.g., an iron alloy), ceramic, cermet, or diamond-like carbon (DLC) material and may be formed on the one or more surfaces of the gear set 42 by physical vapor deposition (PVD), chemical vapor deposition (CVD), or a thermal spraying technique.

In some embodiments, all surfaces 88, 102, 104 and faces 90, 92 of the inner and outer gears 74, 76 of the gear set 42 may be coated or otherwise treated to improve the tribological characteristics thereof. In such case, the coatings and/or treatments applied to each of the surfaces 88, 102, 104 and faces 90, 92 of the inner and outer gears 74, 76 may be the same or the coatings and/or treatments applied to the surfaces 88, 102, 104 and faces 90, 92 may be different. In other embodiments, none of the surfaces 88, 102, 104 and faces 90, 92 of the inner and outer gears 74, 76 of the gear set 42 may be coated or treated. In one embodiment, the outer circumferential surface 88 and the axial front and rear faces 90, 92 of the gear set 42 may be coated or otherwise treated, but the outer and inner circumferential surfaces 102, 104 of the inner and outer gears 74, 76 may not be coated or treated. In another embodiment, the outer and inner circumferential surfaces 102, 104 of the inner and outer gears 74, 76 may be coated or otherwise treated, but the outer circumferential surface 88 and the axial front and rear faces 90, 92 of the gear set 42 may not be coated or otherwise treated.

In some embodiments, the outer circumferential surface 88 and the axial front and rear faces 90, 92 of the gear set 42 may be coated or otherwise treated to improve the lubricity and/or friction behavior thereof. In such case, for example, one or more of the outer circumferential surface 88 and the axial front and rear faces 90, 92 of the gear set 42 may be coated with a metal, metal alloy, ceramic, cermet, or diamond-like carbon (DLC) material using an electroplating, electroless plating, PVD, CVD, or thermal spraying technique. Additionally or alternatively, the outer circumferential surface 102 of the inner gear 74 (defining N teeth 80) and/or the inner circumferential surface 104 of the outer gear 76 (including N+1 teeth 82) may be coated or otherwise treated to improve the wear resistance thereof. In such case, for example, the outer circumferential surface 102 of the inner gear 74 and/or the inner circumferential surface 104 of the outer gear 76 may be coated with a metal alloy, ceramic, or cermet using a PVD, CVD, or thermal spraying technique and/or may be chemically treated using an anodizing, boriding, nitriding, and/or carburizing process. In embodiments where a chemical or thermal treatment is applied to one or more of the surfaces 88, 102, 104 and/or faces 90, 92 of the inner and outer gears 74, 76 in combination with a coating, the coating may be applied to the surfaces 88, 102, 104 and/or faces 90, 92 after the chemical or thermal treatment process is complete such that the coating overlies the chemically or thermally treated layer.

The electric motor 24 controls operation of the hydraulic gerotor pump 22 and includes an annular rotor 98 coupled to the drive shaft 64 and a stator 100 surrounding the rotor 98. In one form, the electric motor 24 may be a permanent magnet electric motor, e.g., a brushless direct current (BLDC) electric motor. The stator 100 may be carried by the housing 40 of the gerotor pump 22 and includes multiple circumferentially disposed magnetic coils or electrical windings (not shown) configured to produce a rotating magnetic field when energized by an electric current, for example, from the transmission control module 26. The rotor 98 is rotatable with respect to the stator 100 and includes multiple circumferentially mounted permanent magnets (not shown) of alternating polarity facing the stator 100. When the windings of the stator 100 are energized and a rotating magnetic field is produced, the permanent magnets of the rotor 98 follow the rotation of the magnetic field and cause the rotor 98 to rotate. The rotation of the rotor 98 applies torque directly to the drive shaft 64, which drives rotation of the gear set 42 and operation of the hydraulic gerotor pump 22.

The electric motor 24 is sized to ensure that it can provide sufficient torque to the inner gear 74 of the gear set 42 to effectively drive rotation of the gear set 42, even at the lowest possible operating temperatures, e.g., at temperatures as low as −40° C., when the viscosity of the hydraulic fluid is at a maximum. Because the housing 40 and the gear set 42 of the presently disclosed gerotor pump 22 exhibit substantially the same linear coefficients of thermal expansion, the axial clearance 96 between the gear set 42 and the housing 40 will remain constant over the entire operating temperature of the gerotor pump 22. And, by achieving a substantially constant axial clearance 96 over the entire operating temperature of the gerotor pump 22, the amount of torque required to initiate rotation of the gear set 42 at very low temperatures (e.g., at temperatures less than 0° C.) may be reduced, as compared to the amount of torque that would otherwise be required to initiate rotation of a steel gear set disposed within the same aluminum-based housing 40. As such, the size or power rating of the electric motor 24 responsible for driving rotation of the gear set 42 likewise may be reduced, as compared to the required power rating of electric motors employed in other automatic transmission systems to drive rotation of steel gear sets disposed within aluminum-based housings of hydraulic gerotor pumps. These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A hydraulic gerotor pump for an automatic transmission, the pump comprising:
    a housing having an inlet and an outlet, and defining a cavity in fluid communication with the inlet and the outlet thereof; and
    a gear set rotatably disposed within the cavity of the housing, the gear set comprising an inner gear and an outer gear, the inner gear and the outer gear having radially opposed intermeshing teeth that together define a plurality of circumferentially disposed variable volume pumping chambers therebetween,
    wherein the housing is made of a first aluminum-based material,
    wherein the inner and outer gears of the gear set are made of a second aluminum-based material,
    wherein a linear coefficient of thermal expansion of the first aluminum-based material is substantially the same as that of the second aluminum-based material such that an axial clearance between the gear set and the housing is in a range of 0.03 millimeters to 0.09 millimeters at temperatures in a range of −40° C. to 160° C., and
    wherein surfaces of the inner gear and the outer gear are (i) coated with an iron alloy, ceramic, cermet, or diamond-like carbon material and/or (ii) treated by boridinq and/or carburizing.

2. The pump of claim 1 wherein the pump exhibits a volumetric efficiency greater than 80% at temperatures in a range of −40° C. to 160° C.

3. The pump of claim 1 wherein the housing comprises an aluminum alloy comprising at least one alloying element selected from the group consisting of iron (Fe), silicon (Si), copper (Cu), magnesium (Mg), manganese (Mn), or zinc (Zn), and wherein the housing is formed by casting.

4. The pump of claim 1 wherein the inner gear and the outer gear of the gear set comprise an aluminum alloy comprising at least one alloying element selected from the group consisting of iron (Fe), silicon (Si), copper (Cu), magnesium (Mg), manganese (Mn), or zinc (Zn).

5. The pump of claim 4 wherein the aluminum alloy exhibits a linear coefficient of thermal expansion in a range of 21 μm/m-° C. to 24 μm/m-° C. at temperatures in a range of 20° C. to 100° C.

6. The pump of claim 4 wherein the inner gear and the outer gear of the gear set are formed by casting or forging.

7. The pump of claim 4 wherein the inner gear and the outer gear of the gear set comprise an aluminum-matrix composite, wherein a matrix phase of the aluminum-matrix composite comprises the aluminum alloy and a dispersed phase of the aluminum-matrix composite comprises a ceramic, and wherein the dispersed phase comprises AlN, SiC, $Al_2O_3$, C, $SiO_2$, B, BN, $B_4C$, $Si_3N_4$, TiC, $TiO_2$, $TiB_2$, graphite, or a combination thereof.

8. The pump of claim 7 wherein the inner gear and the outer gear of the gear set are formed by powder metallurgy.

9. The pump of claim 1 wherein the housing comprises a body and a cover, the cavity is at least partially defined by a back wall and a circular side wall of the body of the housing and by a face wall of the cover of the housing, and wherein the body of the housing is of unitary one-piece construction.

10. The pump of claim 9 wherein the inner gear and the outer gear together define a front face of the gear set that faces toward and opposes the face wall of the cover of the housing, a rear face of the gear set that faces toward and opposes the back wall of the body of the housing, and an outer circumferential surface of the gear set that faces toward and opposes the circular side wall of the body of the housing.

11. The pump of claim 10 wherein the gear set is sized and positioned within the cavity of the housing such that the axial clearance is defined between the front face of the gear set and the face wall of the housing, and wherein the axial clearance is substantially constant at temperatures in a range of −40° C. to 160° C.

12. The pump of claim 11 wherein the axial clearance between the front face of the gear set and the face wall of the housing is in a range of 0.03 mm to 0.09 mm at temperatures in a range of −40° C. to 160° C.

13. The pump of claim 10 wherein the front face, the rear face, or the outer circumferential surface of the gear set is coated with an iron alloy, ceramic, cermet, or diamond-like carbon (DLC) material.

14. The pump of claim 1 wherein the inner gear of the gear set has an outer circumferential surface and the outer gear of the gear set has an inner circumferential surface, and wherein the intermeshing teeth of the gear set are defined by the outer circumferential surface of the inner gear and the inner circumferential surface of the outer gear.

15. The pump of claim 14 wherein the outer circumferential surface of the inner gear or the inner circumferential surface of the outer gear is coated with an iron alloy, ceramic, or cermet.

16. The pump of claim 14 wherein the outer circumferential surface of the inner gear or the inner circumferential surface of the outer gear has been chemically treated by a boriding or carburizing process.

17. A hydraulic system for an automatic transmission, the system comprising:
a hydraulic gerotor pump comprising:
a housing having an inlet and an outlet, and defining a cavity in fluid communication with the inlet and the outlet thereof; and
a gear set rotatably disposed within the cavity of the housing, the gear set comprising an inner gear and an outer gear, the inner gear and the outer gear having radially opposed intermeshing teeth that together define a plurality of circumferentially disposed variable volume pumping chambers therebetween,
wherein the housing is made of a first aluminum-based material and the inner gear and the outer gear of the gear set are made of a second aluminum-based material, and
wherein a linear coefficient of thermal expansion of the first aluminum-based material is substantially the same as that of the second aluminum-based material such that an axial clearance between the gear set and the housing is in a range of 0.03 millimeters to 0.09 millimeters at temperatures in a range of −40° C. to 160° C., and
wherein surfaces of the inner gear and the outer gear are (i) coated with an iron alloy, ceramic, cermet, or diamond-like carbon material and/or (ii) treated by boridinq and/or carburizing; and
an electric motor including a rotor coupled to a drive shaft and a stator surrounding the rotor, the rotor including multiple circumferentially disposed permanent magnets,
wherein the drive shaft of the electric motor is mechanically coupled to the inner gear of the gear set of the hydraulic gerotor pump and is operable to drive rotation of the gear set.

18. The system of claim 17 further comprising:
a hydraulic fluid sump in fluid communication with the inlet of the housing.

19. The system of claim 17 further comprising:
a transmission control system in fluid communication with the outlet of the housing.

20. An automatic transmission comprising:
a hydraulic gerotor pump comprising:
a housing having an inlet and an outlet, and defining a cavity in fluid communication with the inlet and the outlet thereof; and
a gear set rotatably disposed within the cavity of the housing,
wherein the housing is made of a first aluminum-based material and the inner gear and the outer gear of the gear set are made of a second aluminum-based material, and
wherein a linear coefficient of thermal expansion of the first aluminum-based material is substantially the same as that of the second aluminum-based material such that an axial clearance between the gear set and the housing is in a range of 0.03 millimeters to 0.09 millimeters at temperatures in a range of −40° C. to 160° C., and
wherein surfaces of the inner gear and the outer gear are (i) coated with an iron alloy, ceramic, cermet, or diamond-like carbon material and/or (ii) treated by boridinq and/or carburizing;
an electric motor including a rotor coupled to a drive shaft and a stator surrounding the rotor, wherein the drive shaft of the electric motor is mechanically coupled to the inner gear of the gear set of the hydraulic gerotor pump and is operable to drive rotation of the gear set;
a hydraulic fluid sump in fluid communication with the inlet of the housing;
a transmission control system in fluid communication with the outlet of the housing; and
a gear and clutch arrangement that transmits torque between an input shaft and an output shaft, wherein the gear and clutch arrangement selectively receives pressurized hydraulic fluid from the transmission control system.

* * * * *